United States Patent [19]

Takagi

[11] Patent Number: 4,988,972
[45] Date of Patent: Jan. 29, 1991

[54] METHOD FOR TRANSMITTING AND RECEIVING SIGNALS OVER TRANSMISSION POWER LINES

[75] Inventor: Masatoshi Takagi, Tokyo, Japan

[73] Assignee: Osaki Electric Co., Ltd., Tokyo, Japan

[21] Appl. No.: 419,550

[22] Filed: Oct. 10, 1989

[30] Foreign Application Priority Data

Oct. 18, 1988 [JP] Japan .................... 63-261980

[51] Int. Cl.$^5$ .................................. H04M 11/04
[52] U.S. Cl. ......................... 340/310 A; 340/310 R; 370/43; 375/37
[58] Field of Search ............ 340/310 R, 310 A, 825.7, 340/825.71, 825.77; 370/43; 375/37

[56] References Cited

U.S. PATENT DOCUMENTS

| | | | |
|---|---|---|---|
| 4,400,688 | 8/1983 | Johnston et al. | 340/310 A |
| 4,563,679 | 1/1986 | Arai et al. | 340/310 A |
| 4,737,657 | 4/1988 | Jatko et al. | 340/310 A |

FOREIGN PATENT DOCUMENTS 58-12291  1/1983  Japan .
61-280724 12/1986 Japan .

OTHER PUBLICATIONS

T. L. J. Salo–Load Management and Remote Meter Reading System, Apr. 13, 1987, pp. 268–271/IEEE Mates Fifth International Conference on Metering Apparatus and Tariffs for Electricity Supply, Conference publication No. 277.

Primary Examiner—Donnie L. Crosland
Attorney, Agent, or Firm—Collard, Roe & Galgano

[57] ABSTRACT

A transmission signal sending and receiving method using the steps of setting the reference channel and data channels in each cycle of the AC voltage wave for transmission in the sending and receiving means, superposing the reference transmission signal onto the reference channel and the modulated data transmission signals onto the data channels in the sending means, receiving the reference transmission signal and data transmission signals by being separated from the AC voltage wave for transmission in the receiving means, and monitoring data transmission signals by comparing the level and phase of the reference transmission signal received by the reference channel with those of the data transmission signals received in the data channels, and thereby comparing the reference transmission signal with the data transmission signals received in each cycle of the AC voltage wave for transmission.

5 Claims, 3 Drawing Sheets

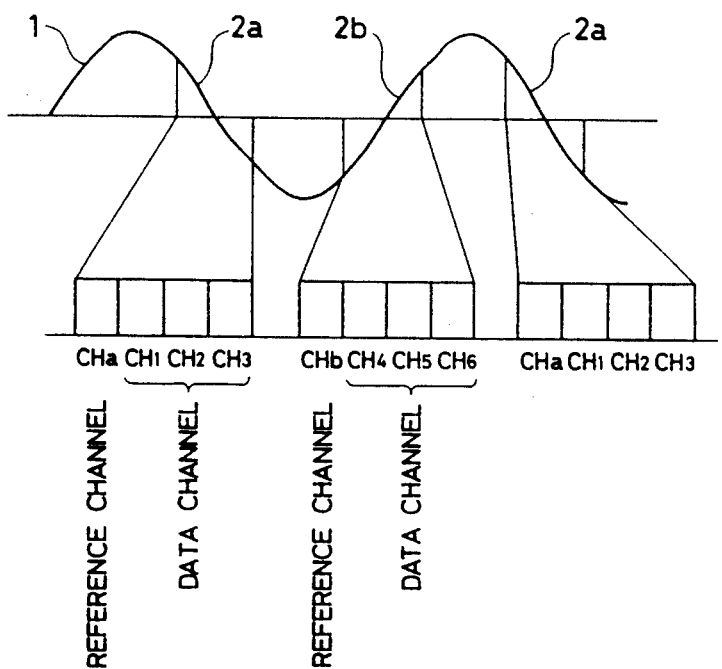
FIG.2
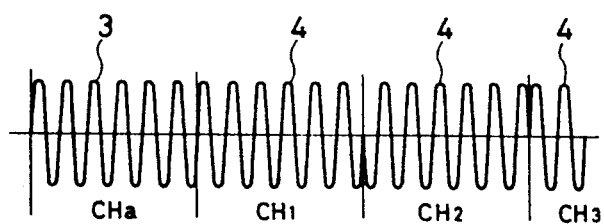

METHOD FOR TRANSMITTING AND RECEIVING SIGNALS OVER TRANSMISSION POWER LINES

BACKGROUND OF THE INVENTION

1. Field of the Invention

The present invention relates to an improved method for transmitting and receiving signals having data such as electrical power metering information over power lines. The invention uses a transmission signal such as either a phase modulated, frequency modulated or amplitude modulated signal that is superimposed onto the transmission AC voltage wave, transmitted over a low voltage power distribution line and a leased line.

2. The Prior Art

The conventional transmission system using a power distribution line as shown in FIG. 5, has superimposed, as shown in FIG. 5, only the data transmission signals $D_o \sim D_n$ for every several cycles to several tens of cycles of the commercial frequency voltage 1 (for example, Japanese Patent Laid-Open No. 58-12291). In the former case, since the level and phase of data transmission signals $D_o \sim D_n$ change due to the load fluctuation of the power distribution lines, these signals are not stable when finally received. Therefore, in the latter case, the data transmission signals $D_o \sim D_n$ are monitored by comparing the reference transmission signal R received in the receiving side with the following data transmission signals $D_o \sim D_n$, but it has been difficult to ensure highly reliable communication due to the change in level and phase of data transmission signals $D_o \sim D_n$ in every cycle of commercial frequency voltage 1.

SUMMARY OF THE INVENTION

It is therefore an object of the present invention to provide a method for transmitting and receiving signals which ensures reliable communication even if the level and phase of transmission signal change from time to time.

According to the present invention, communication can be conducted reliably even if the level and phase of the transmission signal change, from time to time, by setting a reference channel and data channels in each cycle of the AC voltage wave for transmission in the sending and receiving means, superposing a reference transmission signal on to the reference channel, and providing modulated data transmission signals to the data channels in the sending means, receiving the reference transmission signal and data transmission signals by being separated from the AC voltage wave for transmission in the receiving means, and monitoring the data transmission signals by comparing the level and phase of the reference transmission signal received by the reference channel with those of data transmission signals received in the data channels, and thereby comparing the reference transmission signal with the data transmission signals received in each cycle of the AC voltage wave for transmission.

BRIEF DESCRIPTION OF THE DRAWINGS

FIG. 1 shows an example of channel separations in the present invention;

FIG. 2 shows an example of a waveform of reference transmission and data transmission signals in the present invention;

DETAILED DESCRIPTION OF THE PREFERRED EMBODIMENT

Referring to FIG. 1, there is shown a diagram for explaining the setting of channels in the present invention. In both sending and receiving means, the reference channel $CH_a$, and data channels $CH_1$, $CH_2$, $CH_3$ are set in the low noise region $2a$ in the vicinity of the zero cross point in which the commercial frequency voltage 1 (AC voltage wave for transmission) crosses the zero line from the positive to negative value. The reference channel $CH_b$, and data channels $CH_4$, $CH_5$, $CH_6$ are set in the low noise region $2b$ in the vicinity of zero cross point in which the commercial frequency voltage 1 crosses the zero line from the negative to positive value. When phase modulation is used, the sending means superposes the reference transmission signal 3 having the reference phase to the reference channel $CH_a$ as shown in FIG. 2 and the data transmission signals 4 phase-modulated by data to the data channels $CH_1 \sim CH_3$, respectively. Moreover, the sending means also superposes such signals to the reference channel $CH_b$ and data channels $CH_4 \sim CH_6$. The receiving means defines the signals in reference channels $CH_a$, $CH_b$ as the reference transmission signals 3, while the signals in the data channels $CH_1 \sim CH_6$ as the data transmission signals 4 and monitors and demodulates the waveform of the reference transmission signal 3 and the waveforms of data transmission signals 4 by comparing level and phase of them with each other.

Figure 3:
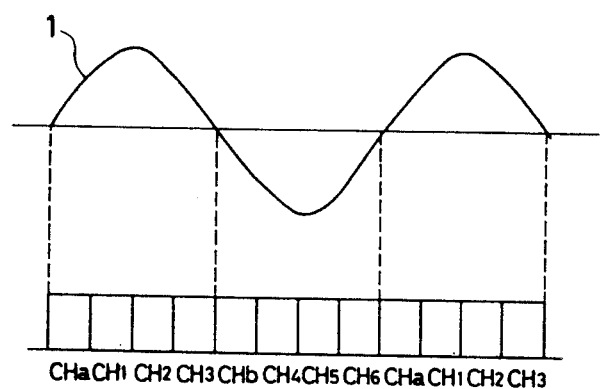
FIG. 3 shows another example of channel separations in the present invention.

As shown in FIG. 3, it is also possible to set the reference channels $CH_a$, $CH_b$ and data channels $CH_1 \sim CH_6$ for each half cycle. Moreover, the reference channel may be set for each cycle in place of setting the reference channel for each half cycle.

Figure 4:
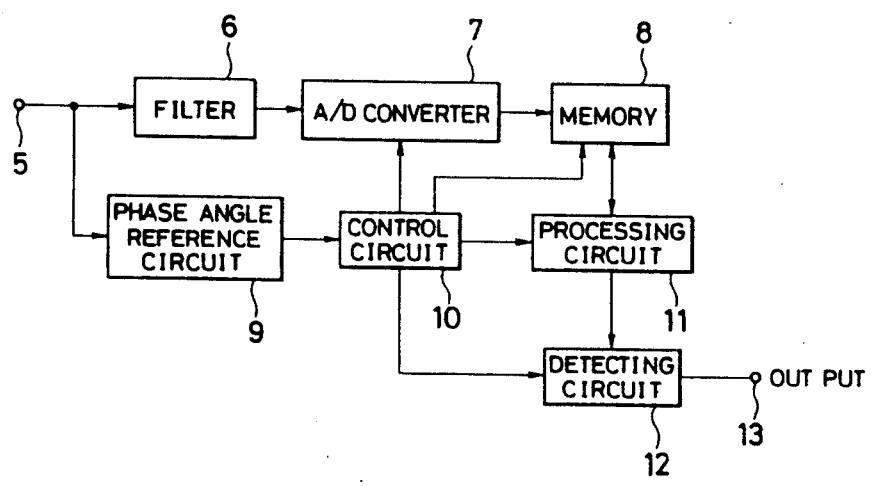
FIG. 4 is a block diagram indicating an example of the receiving means embodying the present invention; and, FIG. 5. shows the conventional transmission system by the power distribution line.
Figure 5:
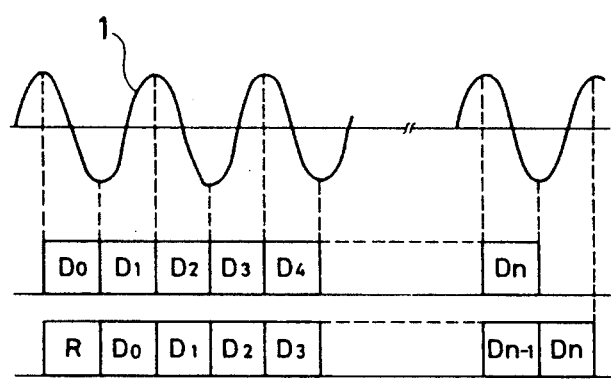

FIG. 4 is an example of the receiving means. A filter 6 separates the reference transmission signal 3 and data transmission signals 4 from the commercial frequency voltage 1 input from the input terminal 5 connected to the low voltage power distribution line and an A/D converter 7 digitalizes the analog waveforms of these signals 3, 4 to store these signals into a memory 8. A phase angle reference circuit 9 detects the phase angle reference point (zero cross point or phase angle $\pi/2$) of the commercial frequency voltage 1 and a control circuit 10 detects, based on the phase angle reference point, the reference channels $CH_a$, $CH_b$, data channels $CH_1 \sim CH_6$, and phase units obtained by further dividing these channels into small sections. Circuit 10 controls the operation of A/D converter 7 in synchronization with the detected channel and phase unit, and writes the detected channels and phase units into the memory 8 together with digital values of the reference transmission signal 3, and data transmission signals 4. A processing circuit 11 compares the levels and phases of reference transmission signal 3 and data transmission signals 4, while a detecting circuit 12 detects and demodulates data transmission signals 4 based on the result of comparing the signals of the processing circuit 11 to output the signals from output terminal 13.

While only a single embodiment has been shown and described it is obvious that many changes and modifications may be made thereunto without departing from the spirit and scope of the invention.

What is claimed is:

1. A method for sending and receiving reference and data signals on a AC voltage wave of a transmission line using sending and receiving means comprising the steps of:

forming a reference channel and data channels and setting the reference and data channels to each cycle of the AC voltage wave for transmission in both sending and receiving means, superposing by means of the sending means, a reference transmission signal onto said reference channel and modulated data transmission signals onto said data channels in said sending means, and receiving said reference transmission signal and data transmission signals in the receiving means by separation from the AC voltage wave for transmission, and comparing the amplitude and phase of the reference transmission signal received in the reference channel and amplitude and phase of the data transmission signals received in the data channels for monitoring the data transmission signals received in the data channels for monitoring the data transmission signals.

2. The sending and receiving method according to claim 1, wherein the reference transmission signal is phase-moculated by the reference, and the data transmission signals are phase-modulated by the data.

3. The sending and receiving method according to claim 1, wherein the reference transmission signal is frequency-modulated by the AC transmission line frequency and data transmission signals are frequency-modulated by the data.

4. The sending and receiving method according to claim 1, wherein the reference transmission signal is amplitude-modulated by the reference and the data transmission signals are amplitude-modulated by the data.

5. The sending the receiving method according to claim 1, wherein the reference channel and data channels are set at approximately the zero cross point of each half cycle of the AC voltage wave.

* * * * *